Aug. 14, 1934.  C. M. BRENNER  1,970,074
FLOAT VALVE
Filed March 27, 1931
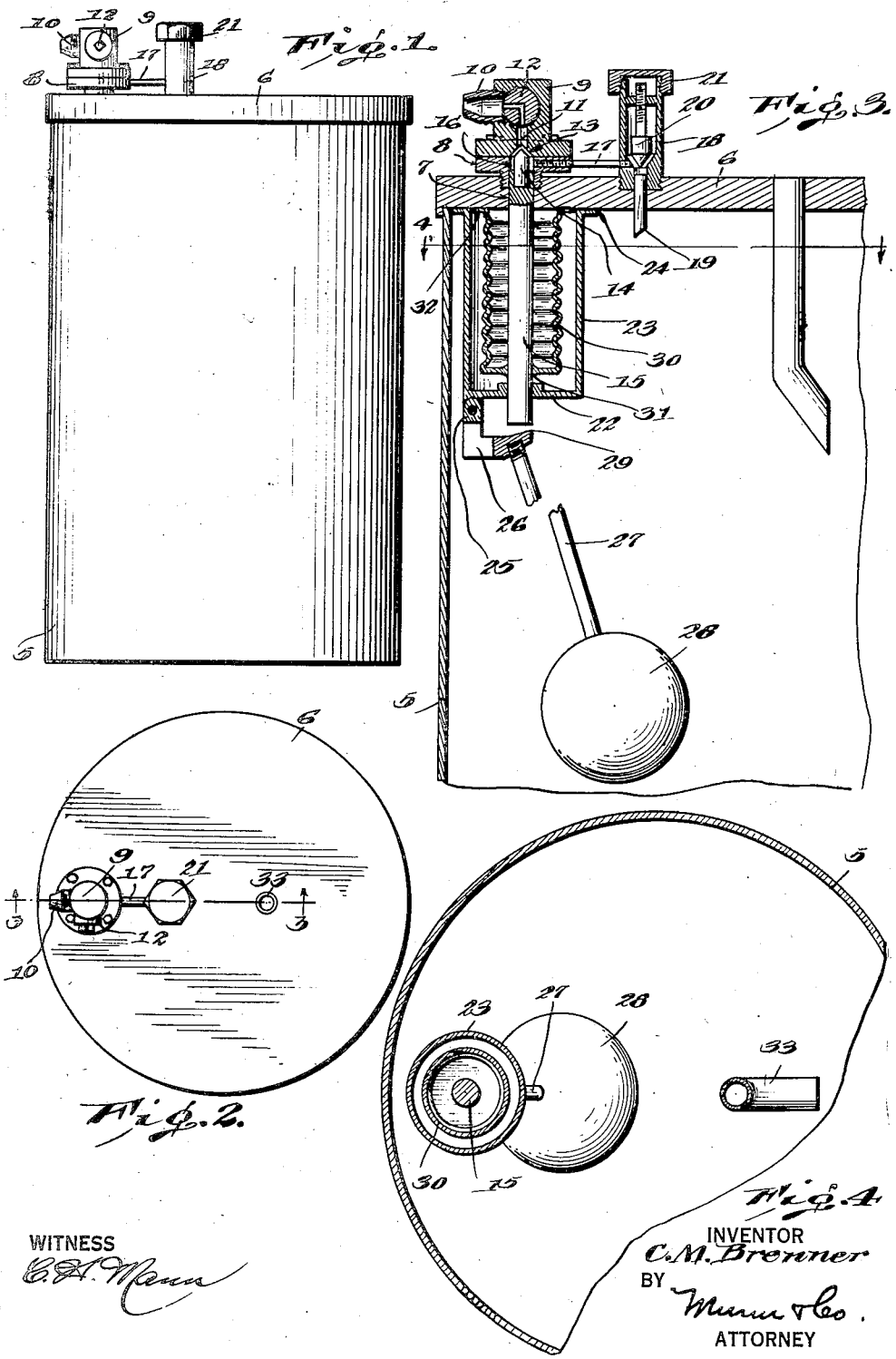
WITNESS
INVENTOR
C. M. Brenner
BY
ATTORNEY Patented Aug. 14, 1934

1,970,074

UNITED STATES PATENT OFFICE 1,970,074

FLOAT VALVE

Charles M. Brenner, Shreveport, La., assignor to Alphonse Brenner Company, Inc., Shreveport, La., a corporation of Louisiana Application March 27, 1931, Serial No. 525,848

1 Claim. (Cl. 137—104)

My invention relates to float valves and particularly to float valves for use on closed tanks, boilers and other installations.

It is an object of the invention to provide a float valve which may be of the needlepoint type, with a seat and valve which may be renewed or repaired without removing the cover plate or valve carrying part of the tank or boiler and which in fact may be renewed or repaired without in any way affecting the material in the tank whether liquid or gaseous.

The advantage of such a structure will be readily obvious when applied to the float valve chamber of sulphur dioxide refrigerating systems and many other installations where with the conventional types of float valves now in use, it is necessary when repairing or renewing the valve or seat to disconnect parts of the apparatus and drain the float valve chamber or tank of all of the liquid contained therein.

Another object of the invention is to provide means in connection with my improved float valve to sever communication between the valve proper and the float chamber and also between the valve and the source of supply to the chamber when it is desired to gain access to the valve or seat.

Other objects and advantages will become apparent during the course of the following detailed description when read in conjunction with the accompanying drawing which forms a part of this specification and in which:

Figure 1 is a side elevation of an embodiment of the invention;

Fig. 2 is a top plan view thereof;

Fig. 3 is a vertical sectional view taken on the line 3—3 of Fig. 2; and

Fig. 4 is a horizontal sectional view taken on the line 4—4 of Fig. 3.

In the drawing, wherein like numerals refer to like parts throughout the same, I have shown my invention, by way of example, as applied to the boiler or float chamber of a sulphur-dioxide refrigerating system although it will of course be understood that the invention is in no wise limited to the application herein shown.

The boiler or float chamber 5 is closed by means of an end abutment or flange 6 which may be permanently attached to the sides of the tank 5 by means of soldering or in any other approved manner.

The closure 6 is provided with a bore 7, into the outer end of which a fitting 8 is threaded. The fitting 8 is provided with a bore of the same size as the bore 7 and forms a continuation thereof. The fitting 8 also includes a circular flange portion to which is bolted or otherwise removably secured a supply valve housing 9. The supply valve housing 9 is provided with a fitting or nipple 10 for connection with the liquid supply source.

The housing 9 is provided with a bore 11 of lesser diameter than the bore 7 but centrally alined therewith. A manually operated cut off valve 12, here shown as a rotary plug valve is provided for the purpose of severing communication between the supply connection 10 and one end of the bore 11. The other end of the bore 11 opens into the upper end of the bore 7 and at this point the housing 9 is provided with a conical seat 13 for cooperation with a needle valve 14.

The needle valve 14 is carried in a recess in the end of a reciprocable valve stem 15, which has a sliding fit within the bore 7, the end of the stem 15 terminating somewhat short of the needle valve 14 which is of lesser diameter than the stem 15, thereby producing a small compartment 16 within which the needle valve is disposed.

A tube or duct 17 is threaded into the fitting 8 and has one end in communication with the needle valve compartment 16. The other end of the duct 17 opens into an inlet valve chamber 18, which in turn is provided with a passage 19 discharging into the chamber or tank 5. The valve chamber 18 is provided with a manually controlled valve 20 for severing communication between the duct 17 and the inlet passage 19. The valve chamber may also be provided with a suitable cover 21 for sealing the same against the escape of any liquid or vapors which may back up behind the valve 20. The end of the valve stem 15 which extends into the tank 5 passes through the bottom wall 22 of a cup-shaped guard 23 which surrounds the stem 15 and which is soldered or otherwise secured as at 24 to the inner face of the end closure 6. The bottom wall 22 of the guard member 23 is provided with a depending stud 25 from which a rocker arm 26 is pivotally suspended. A float rod 27 is threadedly secured to the rock arm 26 and supports a float 28 within the tank 5. The rocker arm 26 is provided with a bearing portion 29 which bears against the end of the valve stem 15 to raise said stem to close the needle valve 14 when the liquid in the tank rises to a point to raise the float 28.

For the purpose of preventing any leakage around the stem 15 and through the bore 7, a copper bellows 30 has the closed end thereof soldered as at 31 to the stem 15. The open end of the bellows engages against the end closure 6 around the bore and is soldered to said closure as at 32 so as to effectually seal the bore 7 from the interior of the tank 5. The copper bellows 30 while accomplishing the sealing function stated does not interfere in any way with the operation of the valve stem 15. A suction tube 33, forming no part of the invention, is shown as extending into the tank 5.

It will readily be seen from an inspection of the drawing and from the foregoing description that in case it is desired for any reason to gain access to the valve seat 13 or needle valve 14, it is simply necessary to close the plug 12 to cut off the liquid supply and to close the valve 20 to cut off the tank from communication with the valve compartment 16. The valve housing 9 may then be unbolted or detached from the fitting 8 thereby exposing both the valve seat 13 and the needle valve 14. It will be particularly noted that with my improved construction access may be had to the valve and seat without in any way disturbing the remainder of the apparatus except to temporarily stop the normal operation thereof.

As above stated the invention is capable of use in a great number of instances not specifically stated herein and it will be understood that the embodiment which is herein illustrated is not to be regarded as in any way limiting the application of the device. It will also be understood that various modifications and changes in the details of the construction may be resorted to without departing from the spirit of the invention as defined by the appended claim.

I claim:

In a device of the class described, a float chamber, a float-actuated stem in the chamber and projecting outwardly from the chamber, a bellows, the intermediate portion of the stem being housed within the bellows, said bellows having the inner end secured directly to the inner end of the stem, the other end of the bellows being secured to a wall of the chamber and in embracing relation with the stem where said stem projects through the housing so that the bellows will seal the chamber against the loss of fluid, an intake valve actuated by the stem, a cup-shaped guard member enclosing the bellows and having its open end secured to the wall of the chamber, the stem projecting through the opposite end of the cup-shaped guard member.

CHARLES M. BRENNER.